United States Patent
De Waard et al.

(10) Patent No.: US 11,269,862 B2
(45) Date of Patent: Mar. 8, 2022

(54) METHOD AND DEVICE FOR CHECKING A SITUATION IN A DECENTRALIZED TRANSACTION SYSTEM

(71) Applicant: Robert Bosch GmbH, Stuttgart (DE)

(72) Inventors: Danny De Waard, Besigheim (DE); Diamantis Ververis, Stuttgart (DE); Michael Schaefer, Neckartailfingen (DE); Florian Berg, Tamm (DE); Madhav Achar, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 16/516,548

(22) Filed: Jul. 19, 2019

(65) Prior Publication Data
US 2020/0050600 A1 Feb. 13, 2020

(30) Foreign Application Priority Data

Aug. 8, 2018 (DE) .......................... 102018213304.2

(51) Int. Cl.
*G06Q 40/08* (2012.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC ............................. G06F 16/2379; G06F 16/27
See application file for complete search history.

(56) References Cited

U.S. PATENT DOCUMENTS

| 7,248,868 | B2 * | 7/2007 | Snyder | H04L 41/0816 |
| | | | | 455/418 |
| 10,796,393 | B2 * | 10/2020 | Messerges | G06Q 50/265 |
| 10,891,694 | B1 * | 1/2021 | Leise | H04L 9/3239 |
| 2011/0320492 | A1 * | 12/2011 | Inghelbrecht | G06Q 50/30 |
| | | | | 707/776 |
| 2015/0382325 | A1 * | 12/2015 | Johnson | G08C 19/00 |
| | | | | 370/329 |
| 2016/0300252 | A1 * | 10/2016 | Frank | G06F 16/24578 |

(Continued)

FOREIGN PATENT DOCUMENTS

| EP | 3295349 A1 | 3/2018 |
| EP | 3576031 A1 | 12/2019 |

(Continued)

OTHER PUBLICATIONS

Kamal, et al.: "Packet-Level Attestation (PLA): A Framework for In-Network Sensor Data Reliability", ACM Transactions on Sensor Networks 9 (2), Article 19 (2013), pp. 19:1-19:28.

*Primary Examiner* — Tarek Chbouki
(74) *Attorney, Agent, or Firm* — Norton Rose Fulbright US LLP; Gerard Messina

(57) ABSTRACT

A method for checking a situation in a decentralized transaction system. The method includes the following features: the situation is recognized by a first device in the transaction system, the situation is recorded by the first device with the aid of the transaction system, additional devices in the transaction system are prompted by the first device to detect particular data, the data are detected by the additional devices, The detected data are recorded by the additional devices with the aid of the transaction system and the situation is confirmed or disconfirmed in the transaction system based on the recorded data.

8 Claims, 4 Drawing Sheets

(56) References Cited

U.S. PATENT DOCUMENTS

| | | | |
|---|---|---|---|
| 2017/0109828 A1* | 4/2017 | Pierce | G06Q 40/08 |
| 2017/0256147 A1* | 9/2017 | Shanahan | G08G 1/096775 |
| 2018/0018723 A1 | 1/2018 | Nagla et al. | |
| 2018/0123882 A1* | 5/2018 | Anderson | H04L 41/0813 |
| 2018/0211524 A1* | 7/2018 | Furuichi | G08G 1/096716 |
| 2018/0219893 A1 | 10/2018 | Li et al. | |
| 2019/0319987 A1* | 10/2019 | Levy | G06N 5/046 |
| 2019/0339678 A1* | 11/2019 | Biernat | G06F 16/27 |
| 2019/0347628 A1* | 11/2019 | Al-Naji | G06Q 20/3678 |
| 2019/0349426 A1* | 11/2019 | Smith | H04L 45/20 |
| 2019/0377617 A1* | 12/2019 | Jacobs | G06F 13/4068 |
| 2020/0021443 A1* | 1/2020 | Falk | H04L 9/3247 |
| 2020/0160354 A1* | 5/2020 | Howard | G06K 19/06037 |
| 2021/0105239 A1* | 4/2021 | Smith | H04L 51/22 |

FOREIGN PATENT DOCUMENTS

| | | | |
|---|---|---|---|
| WO | 2017180382 A1 | 10/2017 | |
| WO | 2019177751 A1 | 9/2019 | |

\* cited by examiner

METHOD AND DEVICE FOR CHECKING A SITUATION IN A DECENTRALIZED TRANSACTION SYSTEM

CROSS REFERENCE

The present application claims the benefit under 35 U.S.C. § 119 of German Patent Application No. DE 102018213304.2 filed on Aug. 8, 2018, which is expressly incorporated herein by reference in its entirety.

FIELD

The present invention relates to a method for checking a situation in a decentralized transaction system. The present invention also relates to a corresponding device, a corresponding computer program, as well as a corresponding memory medium.

BACKGROUND INFORMATION

A decentralized transaction system, transaction database or account book (distributed ledger) maintained locally is understood in information technology to mean any computer network that reaches an agreement regarding the sequence and content of particular transactions with the aid of a shared consensus protocol. The term is used below in a broad sense, encompassing private and public systems alike.

European Patent Application No. EP 3295349 A1 describes a computer-implemented method and system for checking the integrity of a computer software for installation using a distributed hash table and a ledger distributed in a computer-computer network (peer-to-peer network, P2P). The method includes determining metadata, which are linked to a transaction dataset stored in the distributed ledger. An indication of an entry stored in the distributed hash table may be determined from the metadata. The method further includes determining a third hash value based on the computer software and determining a fourth hash value from the entry in the distributed hash table. The method further includes comparing the third hash value and the fourth hash value and verifying the integrity of the computer software based on the comparison of the third hash value and of the fourth hash value.

SUMMARY

The present invention provides a method for checking a situation in a decentralized transaction system, a corresponding device, a corresponding computer program, as well as a corresponding memory medium according to the independent claims.

The described approach is based on the finding that an entry in a decentralized transaction system may be compromised by a faulty device or by other external influences. In addition to these influences, the fact alone that it is a single device that has ascertained the event may result in data, pieces of information and their truth value in a decentralized transaction system not being acknowledged by third parties. In particular, in scenarios in which the stored data is intended as proof for the responsibility of a third party for a particular condition the correctness of the data of the aforementioned third parties may be contested.

To remedy this deficiency, an example method described below is, by "assigning" additional devices, to document certain ambient variables (for example, temperature, atmospheric humidity, brightness or vibration) or also other conditions (for example, in image recordings or video recordings) and to store this documentation for the device "assigned" in the aforementioned sense in a decentralized transaction system.

The device thus assigned stores the data on behalf of the first device and thus virtually fulfills the function of a witness for a particular condition at a particular point in time. For this purpose, the relevant data may be stored both directly in the decentralized transaction system as well as at a central memory location.

When storing at a central memory location, the "substantiating" device forms the checksum of the dataset and stores this in the decentralized transaction system, while indicating the memory location of the dataset.

Similar to the approach, according to which in a decentralized transaction system transactions of multiple independent parties are confirmed, and thus a consensus is established regarding the status of the pieces of information, in a sense a consensus at the level of the data sources is thus produced in the present approach.

One advantage of this approach is the chronological, tamper-proof and thus substantiating documentation of particular conditions, ambient variables and their deviations without the need for manual intervention. The assigned devices may invoice their service with the aid of digital contracts in the transaction system themselves with respect to the assigned device that pays the levied fee directly in this same system.

Advantageous refinements of and improvements on the present invention are described herein.

BRIEF DESCRIPTION OF THE DRAWINGS

Exemplary embodiments of the present invention are depicted in the figures and explained in greater detail below.

DETAILED DESCRIPTION OF EXAMPLE EMBODIMENT

Figure 1:
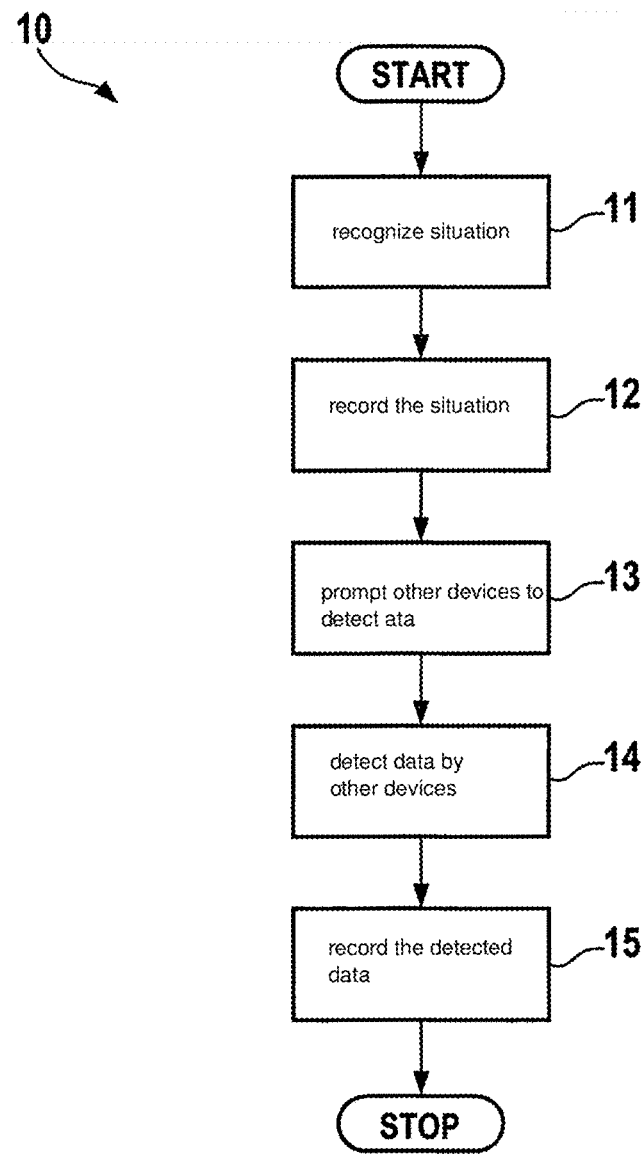
FIG. 1 shows the flow chart of a method according to a first specific embodiment.
Figure 2:
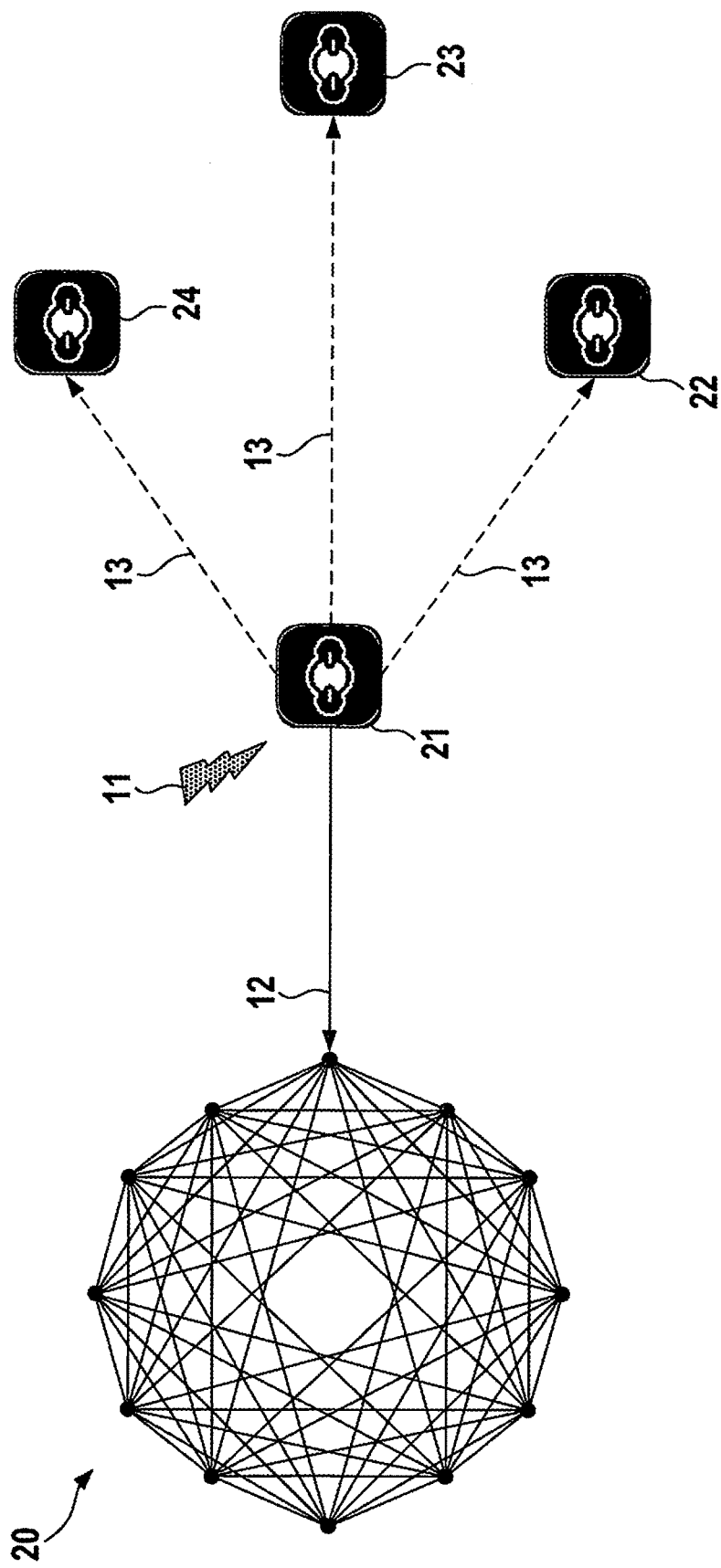
FIG. 2 shows a first phase of the method.
Figure 3:
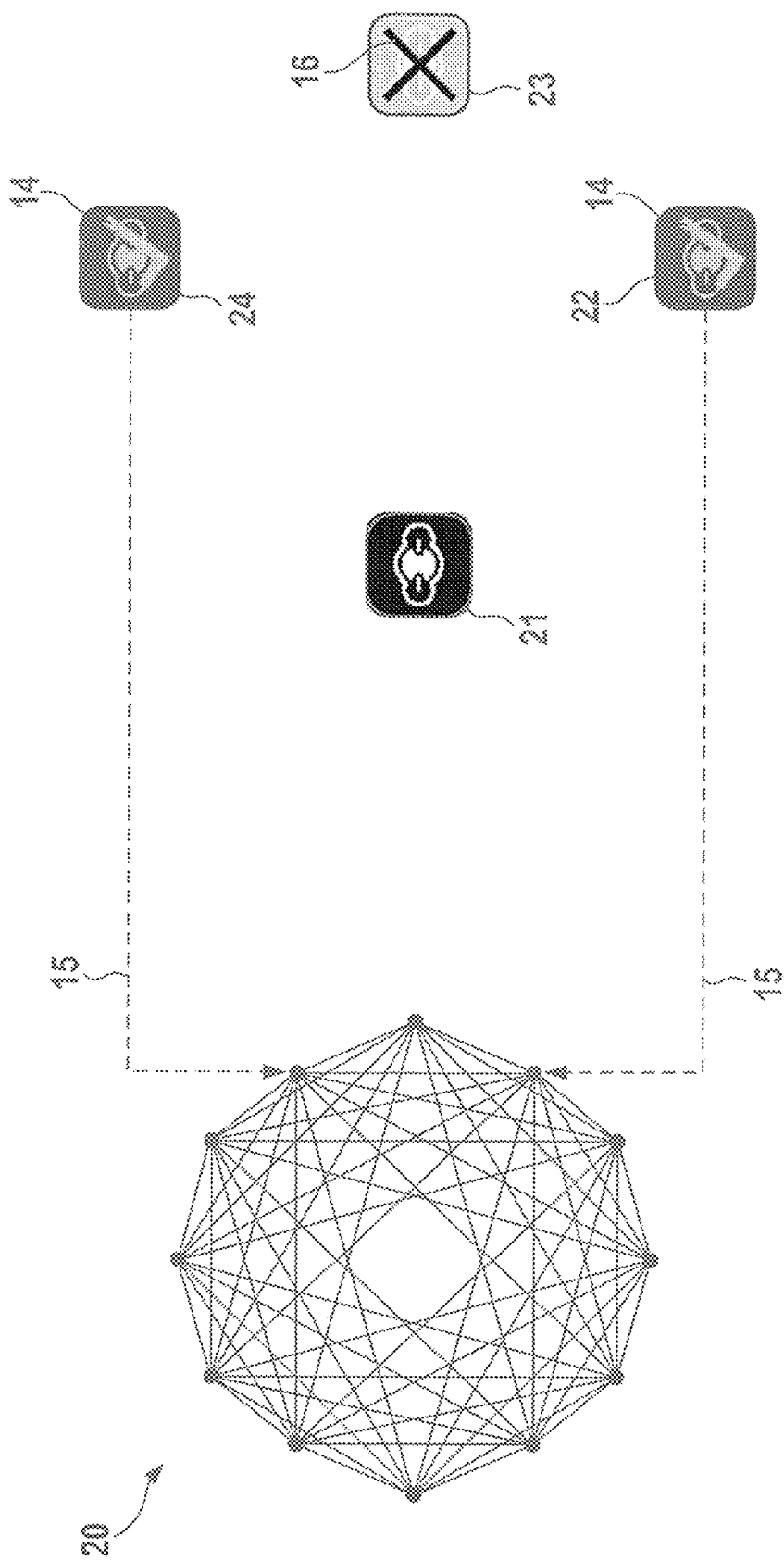
FIG. 3 shows a second phase of the method.

FIG. 1 illustrates the basic sequence of a method 10 according to the present invention, the sequence of which is now explained by way of example with reference to the block diagrams according to FIG. 2 and FIG. 3.

In one preparatory step not depicted in the figures, participating devices 21, 22, 23, 24 each report to one another and inform each other of their respective capabilities. In this way, devices 21, 22, 23, 24 are able to form a P2P computer network or else a part of an existing network, in which data may be exchanged directly between two nodes or multiple nodes. These include, in particular, device 21, whose task it is, among other things, to observe particular situations. Deviations 11 from predefined setpoint conditions or other conditions defined as unexpected may require recording 12 in this case.

If such a device 21 then recognizes such a condition, this condition is then recorded 12. For this purpose, the relevant data are stored in a decentralized transaction system 20. The data may, as described above, be stored directly as part of the transaction or at a central memory location. If the data are stored as part of the transaction in decentralized transaction system 20, then at least an identifier of the device and the data of deviation 11 themselves are noted. If the data are stored at a central memory location, then, instead of the data of deviation 11 itself, the address of the stored dataset of deviation 11, as well as its checksum or variance coefficient (hash) are secured.

To verify the data, first device 21 then prompts 13 other devices 22, 23, 24 to confirm the ascertained state. In this case, the data that verify the event may reflect measured variables other than those by which the event itself is defined. This confirmation takes place with the aid of a call to all other devices 22, 23, 24 reported in above described group 21, 22, 23, 24. In the process, additional devices 22, 23, 24 are informed, in addition to the identifier of calling device 21, of what is to be ascertained or detected—for example, a measurement of the temperature or an image recording of the surroundings. The decision what exactly is to be done may be made both by first device 21 as well as by other devices 22, 23, 24 confirming the event. Artificial intelligence systems (AI) may also be used for such purpose.

In one preferred specific embodiment, additional devices 22, 23, 24 are deliberately not informed of the condition ascertained by caller 21 in order not to influence the independence of their own measurements. This reduces the risk of a manipulation of the results. For example, only the measured variable and not the expected measured value is indicated.

Devices 22, 23, 24 assigned in this way detect 14 and record 15 the desired condition as well either directly in the decentralized transaction system 20 or, as described above, at a central memory location and note in the process the unique identifier, data of deviation 11, as well as the conveyed identifier of calling device 21. If the data of deviation 11 are stored at a central memory location, then instead, the address of the stored dataset of deviation 11, as well as its checksum or variance coefficient, are secured in this case as well. It is understood that a recording 15 is omitted for devices 23 that are unable to ascertain 16 the requested variable.

Based on such recorded data, it is possible to finally either confirm or disconfirm deviation 11. If in the scenario according to FIGS. 2 and 3, for example, device 21 were to determine an absolute value of 120 for a given measured variable X, device 22 an absolute value of 119 for measured variable Y and device 24 an absolute value of 121 for measured variable Z, the result would be described with an absolute value of [X]=120, a general consensus existing about the verification of deviation 11. If, on the other hand, device 22 were to record an absolute value of 87 for measured variable Y and device 24 an absolute value of 89 for measured variable Z, there would then be dissent with respect to the alleged event, which in the present case would instead be described with an absolute value of [X]=88.

Figure 4:
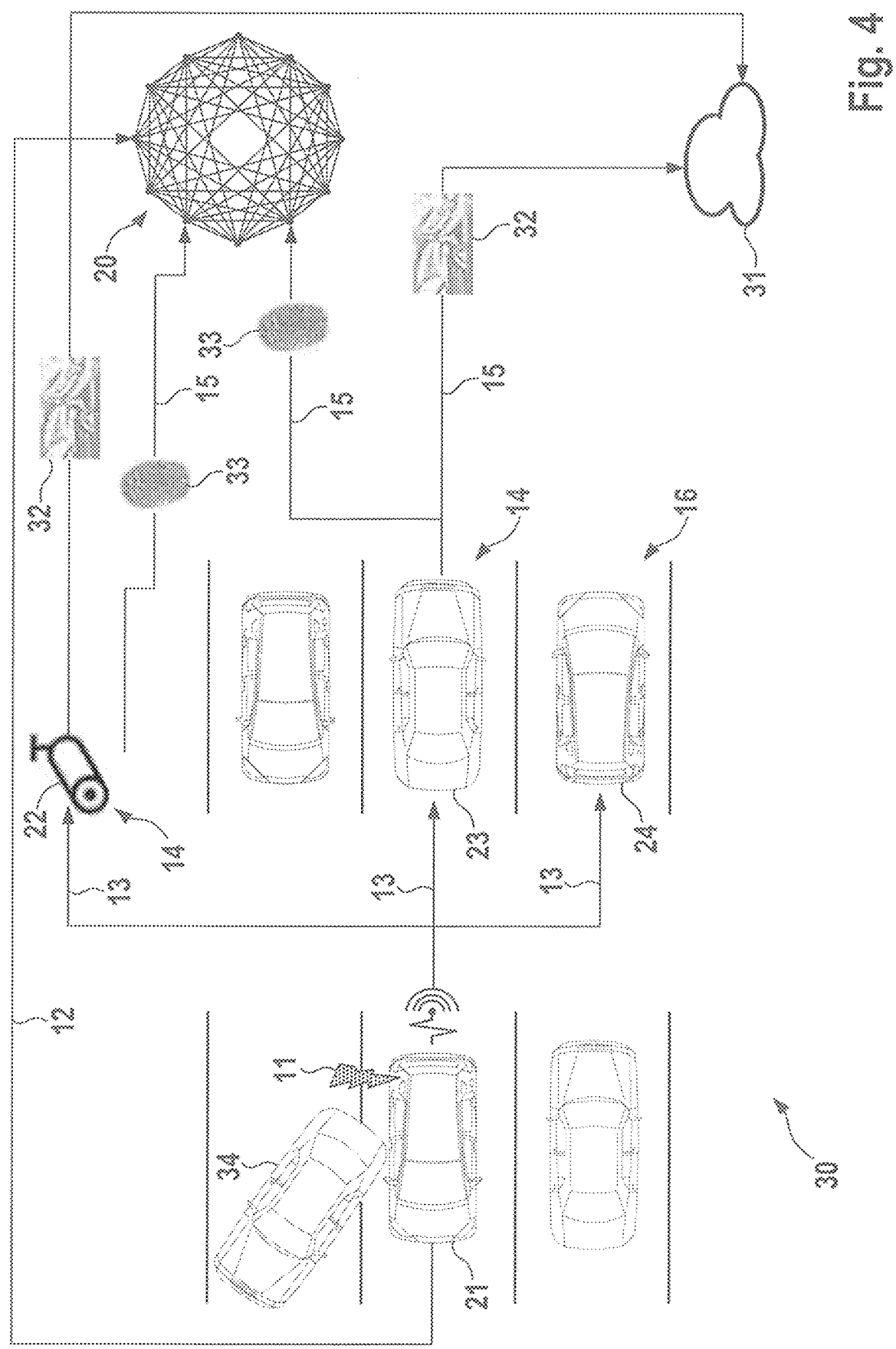
FIG. 4 shows an example for the proof of accidents in parking garages.

FIG. 4 illustrates the approach based on the parking garage damage of an auto.

A parked vehicle 21 is damaged by another vehicle 34 in a parking garage 30 in the absence of the driver. The driver of vehicle 34, guilty of accident 11, leaves the scene of the accident, either deliberately or because he/she did not notice accident 11.

Accident event 11 is ascertained via sensors installed in damaged vehicle 21, and documented in a decentralized transaction system 20 with the aid of the collected sensor data.

The data necessary for ascertainment and documentation may, for example, be vibration data.

However, it is impossible for other vehicles 23, 24 equipped with sensors to verify this event 11 with the aid of the same type of data, since these vehicles are unable to ascertain the vibration of another vehicle.

Damaged vehicle 21 nevertheless prompts other vehicles 23, 24 and a camera 21 installed in parking garage 30 to verify event 11 with the aid of images and thus to bear witness to the accident. Vehicle 23, which has the opportunity to take a picture of accident 11 and is located in an appropriate position relative to damaged vehicle 21, records the image, for example, using an installed rear view camera 14. In addition, as previously described, monitoring camera 21 in parking garage 30 is prompted to take 14 a picture of accident 11. Persons not depicted in the drawings may also be prompted to bear witness to accident 11 via an app on their mobile telephone. In this case, these persons would then in turn bear witness to accident 11 via a photo of event 11. Another vehicle 24 is unable in the present example to photographically document 16 accident 11.

From the photos used in this case as proof of accident 11, checksums 33 are then calculated and subsequently stored in a central memory 31 or held long term in the vehicle. If the images are held long term in the vehicle, the corresponding address of the image material is stored in the decentralized transaction system and is provided at the point in time when it is required to be released. Devices 22, 23 functioning as witnesses each store 12 a transaction in decentralized transaction system 20, in which they store their identification, the address of the stored dataset 32, in this case in the form of an image, its checksum and the identification of the damaged and prompted to be recorded vehicle 21.

Perpetrator 34 of the accident may be depicted on images 32 that have been taken 14 by devices 23, 24 and thus, a corresponding responsibility may be ascertained.

Based on the aforementioned transaction, which ensures the immutability of the substantiating data, in this case, photos 32, blame for accident event 11 may be clearly assigned to perpetrator 34, without the possibility of damaged vehicle 21 being accused of manipulating the data or of compromising the data as a result of malfunction. Assigned vehicle 21 may send substantiating devices 22, 23 an appropriate compensation via the decentralized transaction system 20 utilized.

What is claimed is:

1. A method of a decentralized system, comprising:
    a first vehicle of the decentralized system recognizing an occurrence of a second vehicle crashing into a side of the first vehicle based on output of a vibration sensor of the first vehicle;
    responsive to the recognition:
        recording data regarding the recognized crash by the first vehicle in the decentralized system; and
        prompting a third vehicle that is part of the decentralized system, that has not detected the occurrence of the crash to use a camera of the third vehicle to capture an image of the side of the first vehicle into which the second vehicle has been detected, by the first vehicle, to have crashed;
    responsive to the prompting, capturing by the third vehicle, using the camera of the third vehicle, the image of the side of the first vehicle, wherein the prompting and the capturing occur without the third vehicle being informed of the recognition of the crash;
    recording the image by the third vehicle in the decentralized system; and
    the decentralized system confirming or disconfirming whether the second vehicle crashed into the first vehicle based on the recorded image.

2. The method as recited in claim 1, wherein the recording of the data regarding the crash takes place by storing a dataset in the decentralized system or by storing the dataset in a central memory and a variance coefficient of the dataset in the decentralized system.

3. The method as recited in claim 1, further comprising:
conveying an identifier of the first vehicle to the one or more external devices; and
recording the identifier together with the image by the third vehicle.

4. The method as recited in claim 1, wherein the recording of the data regarding the crash includes storing a time stamp.

5. The method as recited in claim 1, further comprising the first vehicle prompting a mobile telephone to also capture an image of the side of the first vehicle using a camera of the mobile telephone in response to the recognition by the first vehicle of the occurrence of the second vehicle crashing into the first vehicle.

6. The method as recited in claim 1, wherein the prompting of the mobile telephone occurs without the mobile telephone being informed of the recognition of the crash.

7. A non-transitory machine-readable memory medium, on which is stored a computer program for a decentralized system, the computer program, when executed by a computer, causing the computer to perform:
a first vehicle of the decentralized system recognizing an occurrence of a second vehicle crashing into a side of the first vehicle based on output of a vibration sensor of the first vehicle; and
responsive to the recognition:
recording data regarding the recognized crash, by the first vehicle, in the decentralized system; and
prompting a third vehicle that is part of the decentralized system, that has not detected the occurrence of the crash to use a camera of the third vehicle one or more external devices to capture an image of detect the side of the first vehicle into which the second vehicle has been detected, by the first vehicle, to have crashed;
wherein the prompting causes:
the third vehicle to capture, using the camera of the third vehicle, the image of the side of the first vehicle and record the image in the decentralized transaction system, wherein the prompting and the capture occur without the third vehicle being informed of the recognition of the crash; and
the decentralized system to confirm or disconfirm whether the second vehicle crashed into the first vehicle based on the recorded image.

8. A decentralized system comprising:
a first vehicle that includes a vibration sensor; and
a second vehicle;
wherein:
the first vehicle is configured to:
recognize, based on output of the vibration sensor, an occurrence of a third vehicle crashing into a side of the first vehicle; and
responsive to the recognition:
record data regarding the recognized crash event in the decentralized system; and
prompt the second vehicle, which has not detected the occurrence of the crash, to use a camera of the second vehicle to capture an image of the side of the first vehicle into which the third vehicle has been detected, by the first vehicle, to have crashed;
the second vehicle is configured to respond to the prompt by capturing, using the camera of the second vehicle, the image of the side of the first vehicle and record the image in the decentralized system, wherein the prompting of the second vehicle and the detection by the second vehicle occur without the second vehicle being informed of the recognition of the crash; and
the decentralized system is configured to confirm or disconfirm whether the third vehicle crashed into the first vehicle based on the recorded image.

* * * * *